July 8, 1941. A. N. CLOUTIER 2,248,902
KNITTING MACHINE
Filed July 12, 1939 10 Sheets-Sheet 5
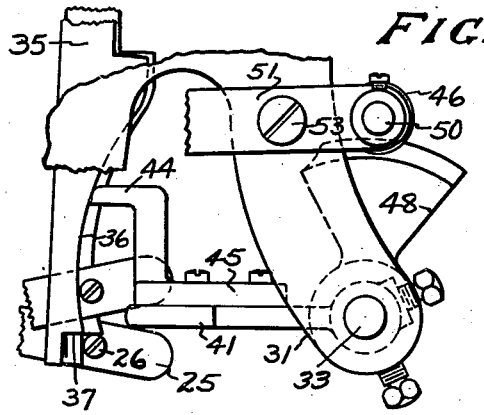
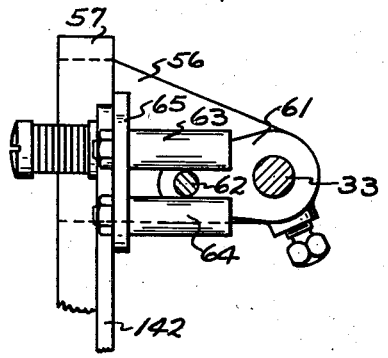
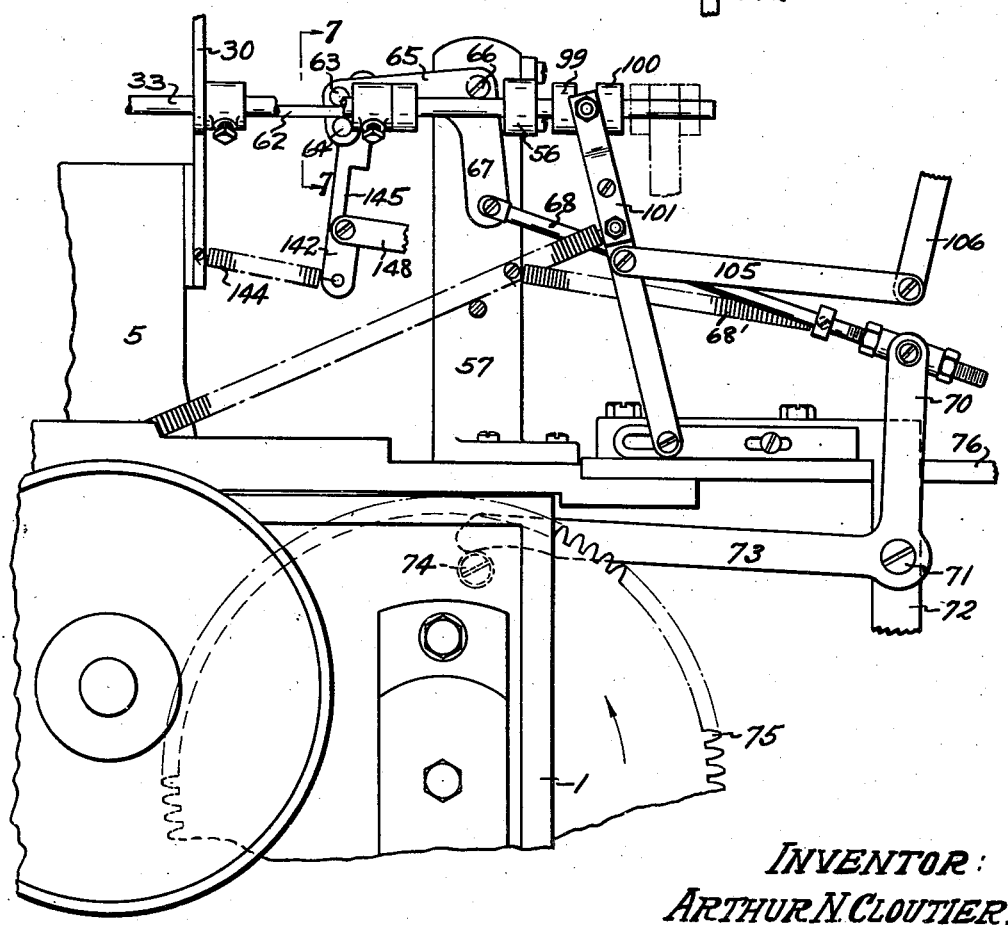
INVENTOR:
ARTHUR N. CLOUTIER,
By Roy F. Lovell
ATT'Y.

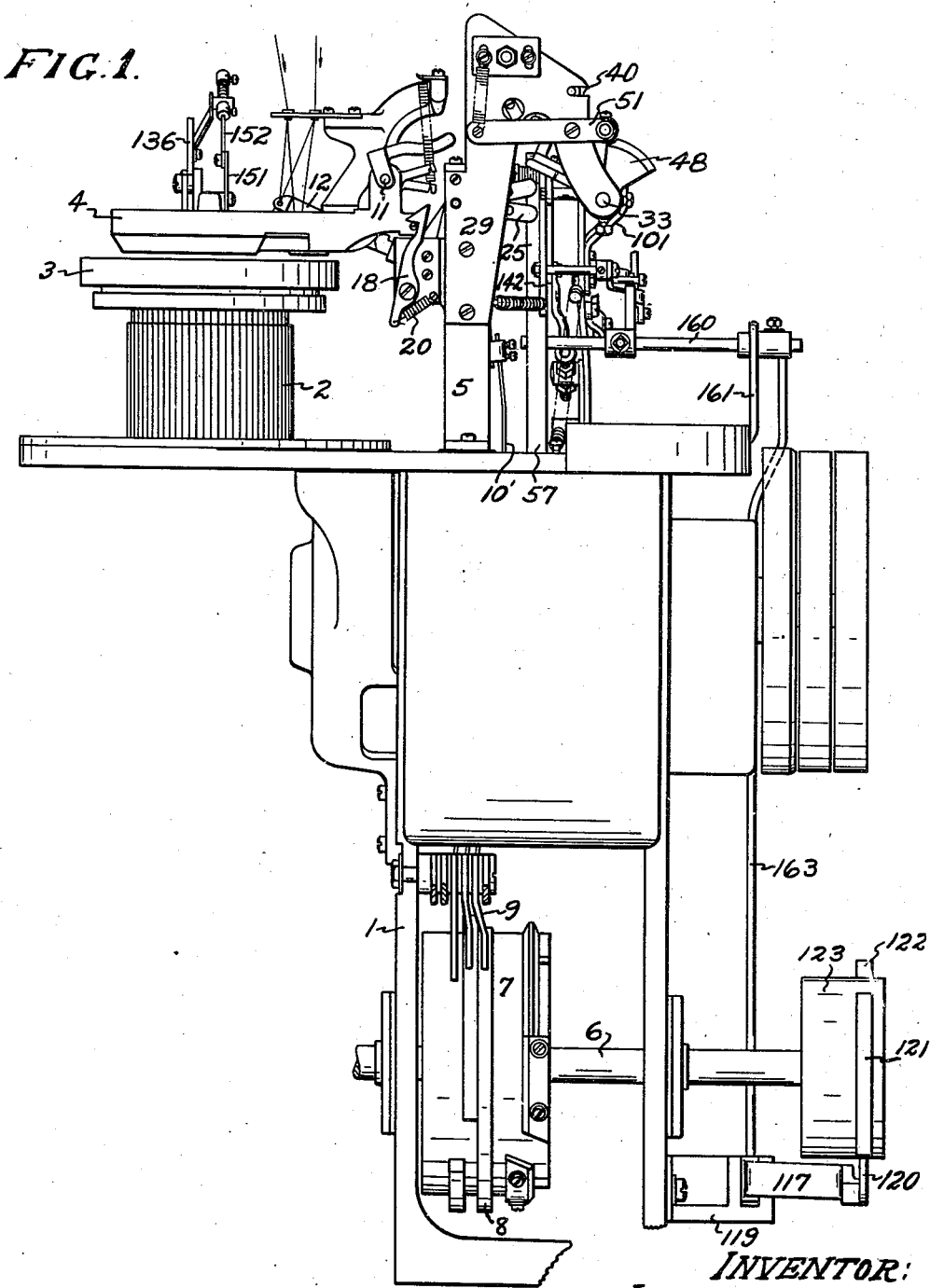

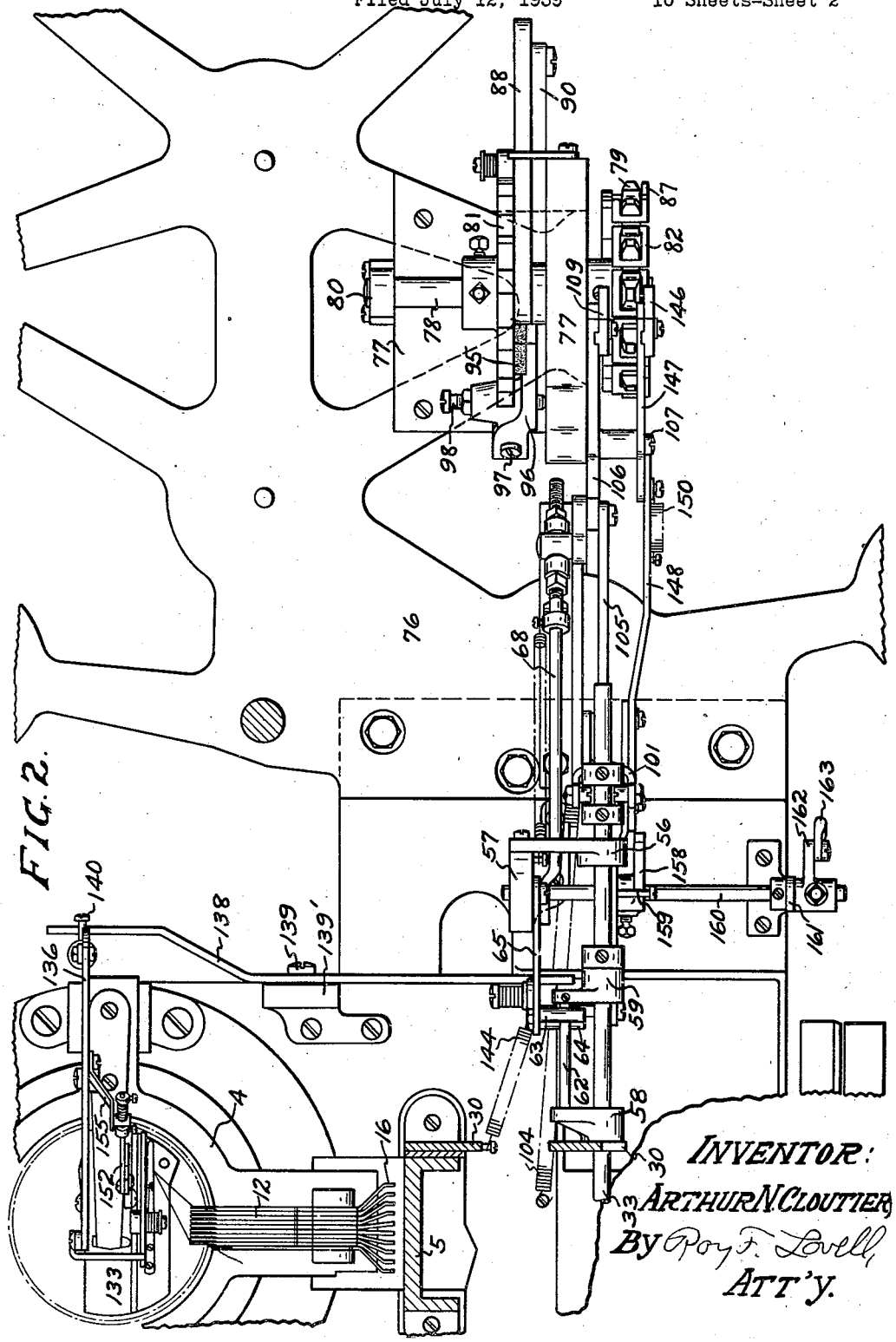

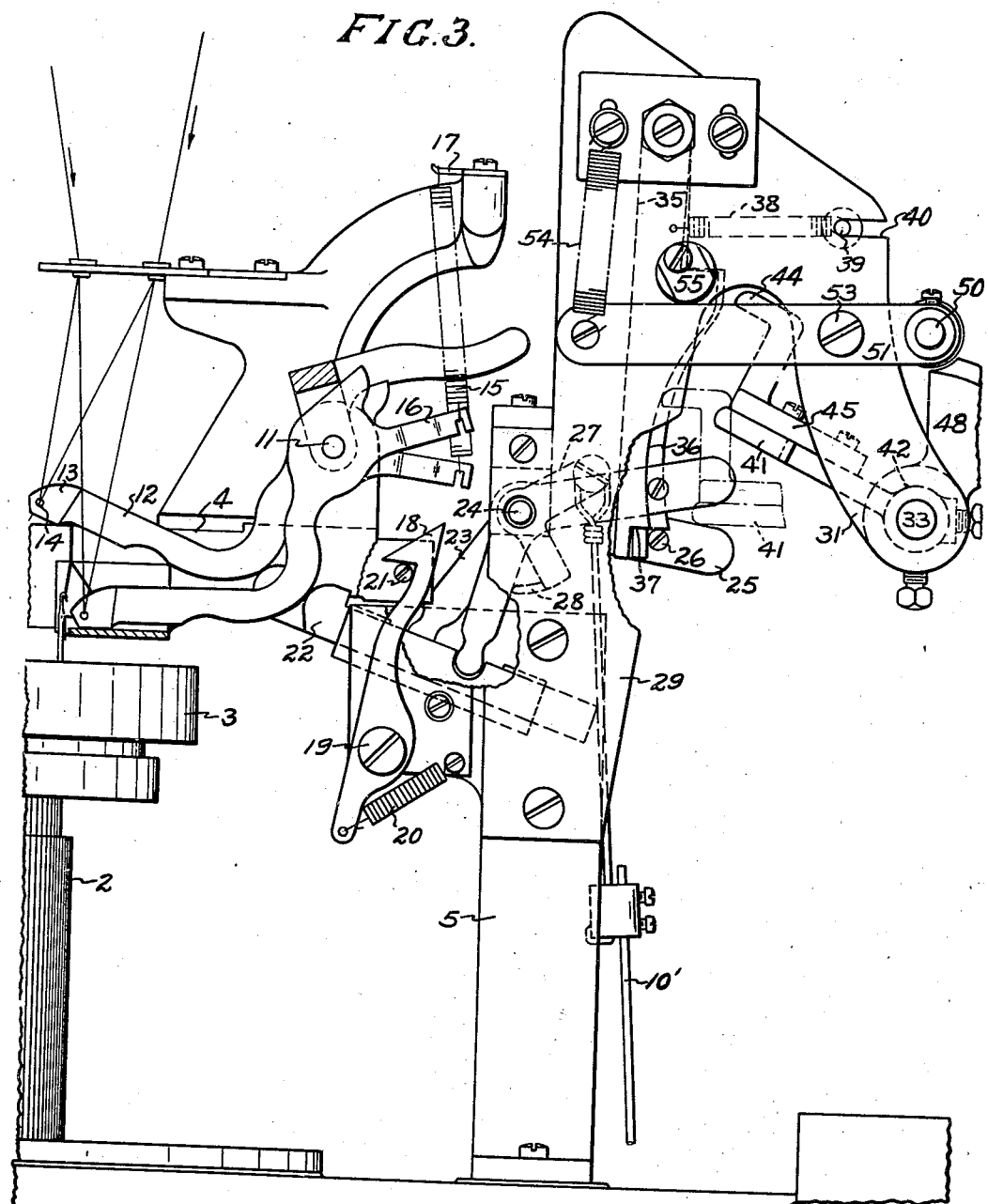

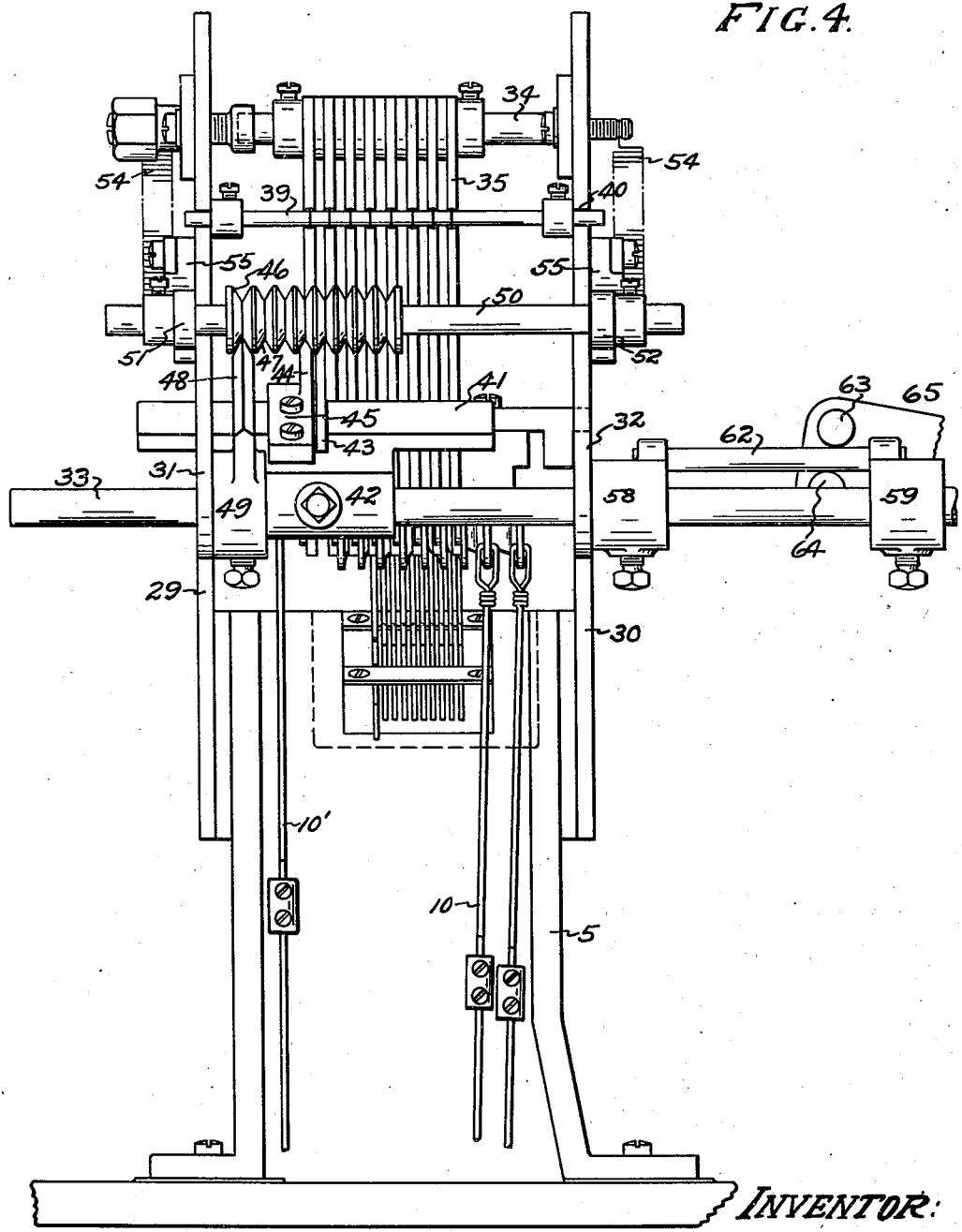

July 8, 1941.    A. N. CLOUTIER    2,248,902
KNITTING MACHINE
Filed July 12, 1939    10 Sheets-Sheet 6

INVENTOR:
ARTHUR N. CLOUTIER,
BY Roy F. Lovell
ATT'Y.

July 8, 1941.  A. N. CLOUTIER  2,248,902
KNITTING MACHINE
Filed July 12, 1939  10 Sheets-Sheet 7

INVENTOR:
ARTHUR N. CLOUTIER,
BY Roy F. Lovell,
ATT'Y.

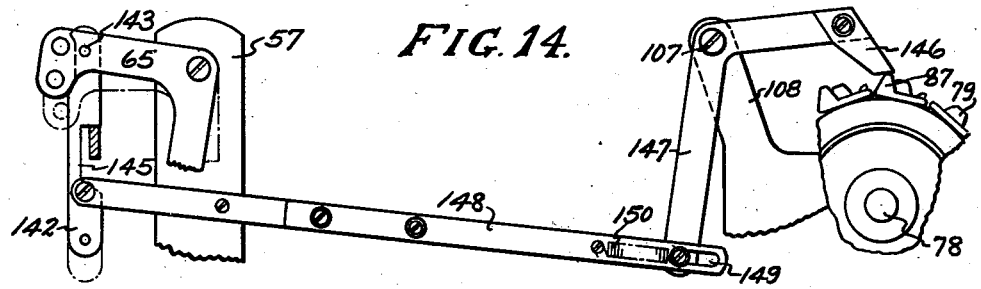
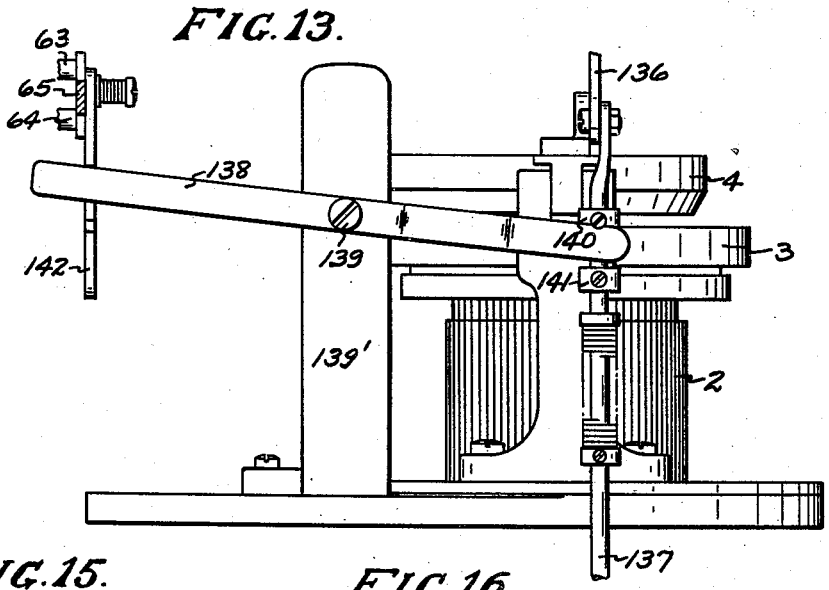
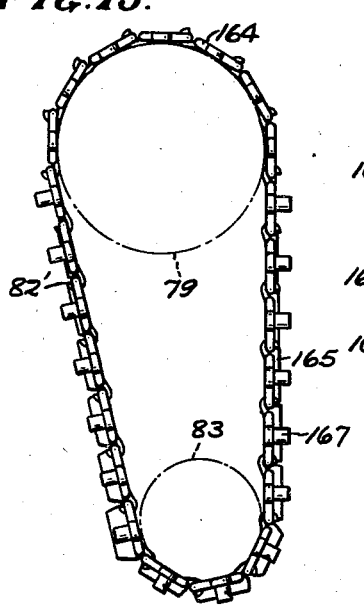
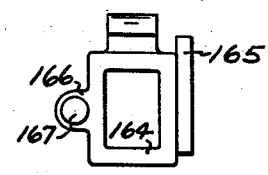

July 8, 1941.   A. N. CLOUTIER   2,248,902
KNITTING MACHINE
Filed July 12, 1939     10 Sheets-Sheet 9

INVENTOR:
ARTHUR N. CLOUTIER,
BY Roy F. Lovell,
ATT'Y.

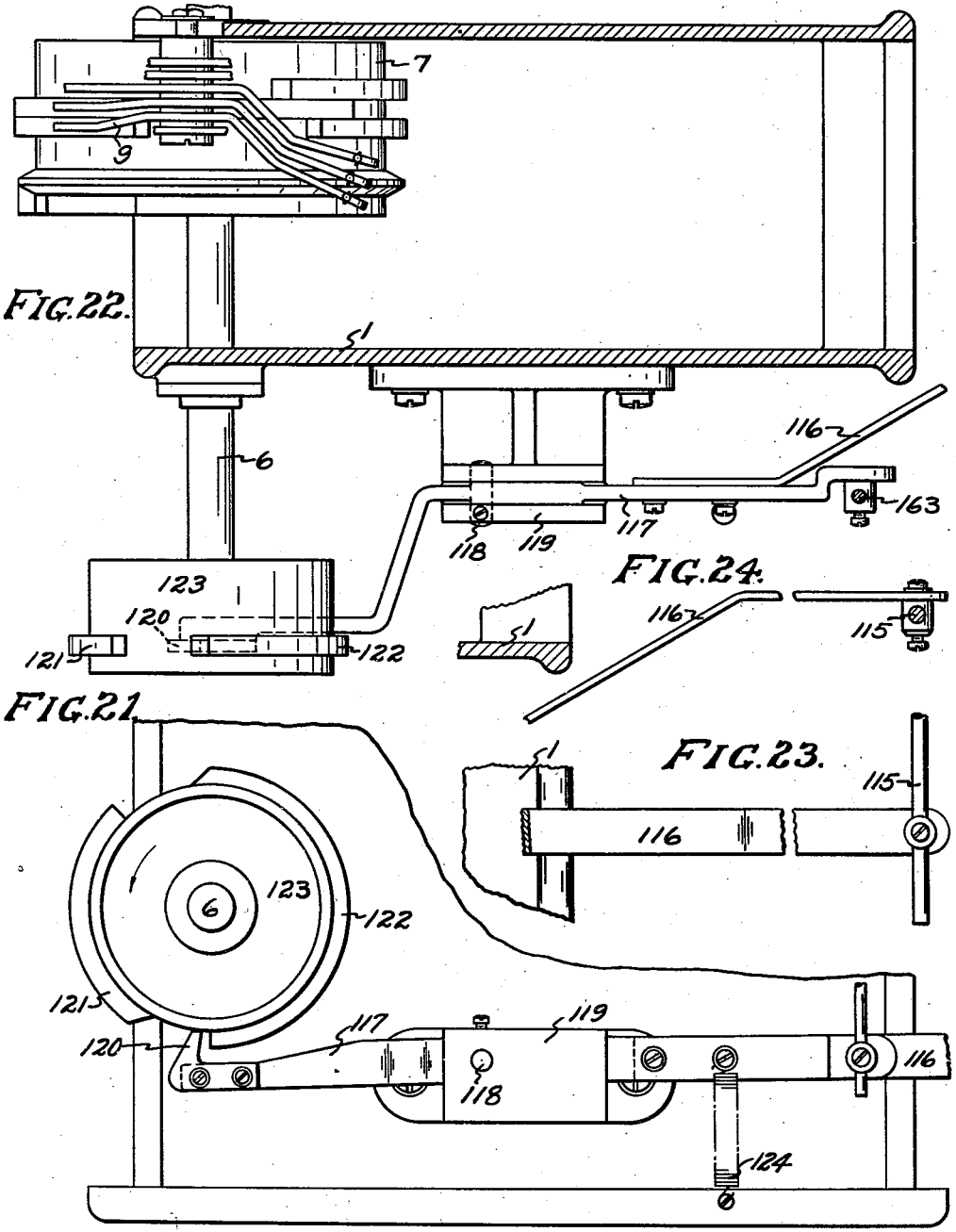

Patented July 8, 1941

2,248,902

UNITED STATES PATENT OFFICE 2,248,902

KNITTING MACHINE

Arthur N. Cloutier, Lonsdale, R. I., assignor to Hemphill Company, Central Falls, R. I., a corporation of Massachusetts Application July 12, 1939, Serial No. 284,026

15 Claims. (Cl. 66—140)

This case involves an invention in yarn feeding means for knitting machines such as is employed for selectively changing yarns as in horizontal striping.

In the figures of the drawings:

Fig. 1 is an elevation of a typical hosiery machine to which the invention has been applied, seen from the front;

Fig. 2 is a plan view showing parts of the machine, yarn feeding levers, binder, and part of the controlling means for yarn changing and for the binder and cutter;

Fig. 3 is an elevation showing the yarn feeding means and immediate control therefor, those parts being shown to a larger scale than in the preceding figures;

Fig. 4 is an elevation showing parts of the yarn feeding lever control means shown in Fig. 3, but as seen from the right hand side of the machine;

Fig. 5 is a detail view of the lever changer mechanism, said changer mechanism being in a position in which a change has just been effected;

Fig. 6 is an elevation taken at the right hand side of the machine and showing means for oscillating the yarn lever changer.

Fig. 7 is a section at line 7—7, Fig. 6, showing in detail part of this oscillating means;

Fig. 8 is an elevation at the right hand side of the machine showing the oscillating means, chain for controlling the striper and binder, ratcheting means for the chain and control for rendering ineffective the ratchet for the chain and retiming it;

Fig. 9 is a detail of the chain as seen from the back of the machine;

Fig. 13 shows part of the connection leading to the binder for controlling it during striping;

Fig. 14 shows the control for the binder as it is derived from the chain;

Fig. 15 is a detail view of the chain;

Figs. 16 and 17 are detail views of one of the links which go to make up the chain;

Fig. 21 is an elevation showing cams on the end of the main cam shaft by means of which the ratchet of the striper is controlled, also for controlling the binder as it is to operate with the striping means;

Fig. 22 is a section through the frame of the machine and showing the cam and lever control just mentioned with respect to Fig. 21; and Figs. 23 and 24 show extensions of the horizontally disposed lever shown in Figs. 21 and 22, respectively.

Figure 11:
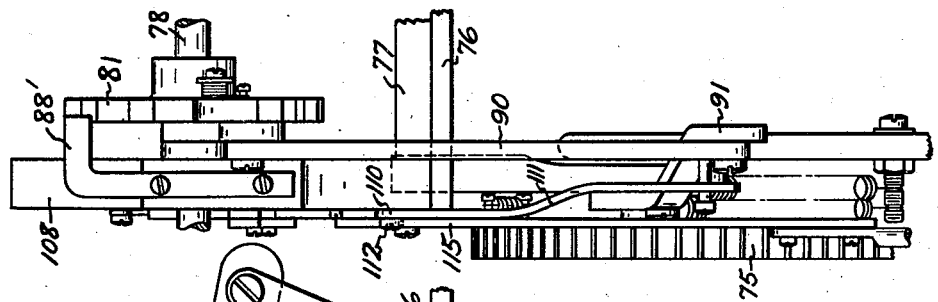
Fig. 11 is an elevation of that mechanism shown in Fig. 10 as seen from the back of the machine.

Horizontal striping devices for knitting machines such as hosiery machines have been fairly common in the art, but their capabilities have, in most instances, been fairly limited in that changes could be made only at multiples of courses and that a few yarns only might be employed. Obviously it is desirable to stripe with a fairly large number of colors and to make changes after single courses or after a widely varying number of courses and in any desired sequence. According to practice in the instance case many more colors may be fed than have normally been availed of and single course stripes may be knitted, or stripes of varying widths from a single course to stripes of a relatively great number of courses. The main source of control is at a single pattern chain by means of which the pattern may be varied as desired, no other parts of the mechanism being disturbed upon changing from one pattern to another. The binder and cutter are automatically controlled to operate at each yarn change or color change and function only at that time. The chain which controls the knitting of the striped pattern also controls the binder and cutter. The details and mode of operation will be apparent to those skilled in the art from the following description.

The striping mechanism may be applied to machines as an integral feature thereof, or may be made in the form of an attachment and applied to existing machines. In Fig. 1 parts of a machine are shown including a frame 1, needle cylinder 2, sinker head 3, carrier ring 4 and yarn control level bracket or post 5. A main cam shaft 6 has the usual drum 7 carrying cams 8 which affect control of the position of some of the yarn levers by means of levers 9 and the usual wires 10, Fig. 4. The machine is of the rotary needle cylinder type, although not necessarily so, and is adapted to rotate at times and to reciprocate at other times as in the knitting of a heel or toe. Driving mechanism for effecting such rotation or reciprocation is well known and examples of such driving mechanism and, in fact, further details of a machine of this type, are available in United States Patent #933,443 so that further description will not be given in this case.

Referring to Figs. 1, 2, 3, 4 and 5, the carrier ring 4 has the usual pivot 11 about which yarn levers or fingers 12 are to swing. There are a plurality of these levers, in this instance ten such levers being shown, although it is to be understood that fewer or more levers may be employed depending upon the type of hosiery to be knitted and other factors entering into the design of the machine. These levers are exceedingly thin and are a departure from the conventional practice in that each lever has a thin yarn feeding end 13 which is drilled with an opening as at 14 for the reception of a yarn or yarns to be fed by the particular lever. As shown in Fig. 2 these levers are arranged side by side and are as close together as possible, the entire group of levers merely being freely mounted so that they may be moved as is necessary for changing to and from feeding position. The thin end 13 allows the yarn to be threaded and provides enough space between levers so that as they move to and from their extreme positions there will be sufficient clearance so that yarns will not become entangled or be interfered with by an adjacent lever. This allows exceedingly thin levers to be used and thus a greater number to be provided in a mouthpiece which will eventually be no wider than one heretofore used. There is a practical limit to the width of mouthpiece beyond which the designer is not free to go. That normally limits the number of levers and incidentally the number of yarns which may be fed. Since certain of the yarns must be used for other purposes such as in the heel and toe, reinforcing, etc., relatively few yarns or colors have been available for striping.

Springs 15 connect to extensions 16 on each lever and to a comb 17, Fig. 3, these springs normally tending to maintain a lever in feeding, that is, its lowermost position. The extensions 16 are offset as shown in Fig. 2 so that the springs may not interfere with one another. The carrier ring 4 is held downwardly by a latch 18 pivoted at 19 and urged by spring 20 into engagement with a projecting pin 21 on the carrier ring itself. Post 5 has slidable in suitable inclined slots a series of plungers 22, one for each lever 12 and in alignment therewith. These plungers are in turn controlled by lever 23 pivoted at 24 and have a toggle connection with each plunger. Each of these levers 23 has a more or less horizontally disposed extension 25, each extension having a short extending projection or pin 26. It is to be understood that these levers 23 and the plungers 22 are employed for each of the yarn feeding fingers or levers 12, but pins 26 need be provided for only such levers as are to feed so-called pattern or striping yarns. The two levers at the right hand end, Fig. 4, are to be employed for other purposes and each has a direct connection through a wire 10 to one of the levers 9 and is thereby controlled from one of the cams 8 on the drum 7, Fig. 1.

One of these cams 8 and another wire 10′, Figs. 3 and 4, are effective through bell crank lever 27 having a lever engaging projection 28 to move all the stripe controlling levers 23, plungers 22 and incidentally the striping yarn feeding levers themselves to inoperative position. Obviously that will be done at such times as none of the striping yarns is to be introduced into the fabric.

The post or bracket 5 has at either side thereof plates 29 and 30 which extend upwardly and have outwardly and downwardly projecting ears or lugs 31 and 32. The shaft 33 is freely movable in bearings at the lower end of these lugs and is periodically oscillated throughout a few degrees as well as being movable axially in accordance with dictates of a pattern chain later to be described. Adjacent the upper end of these plates a short spindle 34 provides a pivoting support for a series of depending latches 35. There are eight of these latches in the particular machine illustrated, one for each of the striping yarn feeding levers. These latches have an arcuate or curved edge 36 and a notched lower end 37. Springs 38 are provided one of which attaches to each latch and is also connected to a bar or rod 39 which is received within slots 40, Figs. 3 and 4. Suitable collars maintain the said rod in place.

Each latch is urged by means of a spring 38 to be drawn to the right, Fig. 3, and will maintain its respective lever 23 in the position which tends to hold the yarn feeding finger or lever in raised or inactive position. To do this latch 37 engages pin 26. The shaft 33 carries a yarn changer mechanism including a widened plate 41 which extends from a hub 42 fixed adjustably on that shaft. This plate 41 is slotted at its mid-position as shown at 43, Fig. 4. The plate also has attached thereto a latch engaging hammer 44 which extends from a bracket 45 as illustrated. This hammer is of sufficient width and is attached to engage the arcuate surface 36 on any particular latch opposite which it is selectively positioned and when moved to the dot and dash position, Fig. 3, will push that latch inwardly so that the pin 26 on the appropriate lever 23 will be released from the notch at the end of the latch. The result is that one of the springs 15 will immediately move to feeding position the yarn lever 12 controlled by the particular lever 23 the latch of which was thus moved. The hammer 44 and notch 43 are so placed that the said notch or slot will allow the plate 41 to move down past the extension 25 to that particular lever which was thus released. In other words, when the lever is released the plate and hammer will be in lowermost position, Fig. 3, dot and dash lines, and the extension 25 will move up through the notch 43.

To assure that the notch and hammer are properly positioned opposite the latch which is to be thus released, a roller 46 has V-shaped notches 47 cut therein spaced throughout the same distances as the latches 35 are spaced and so positioned as to be engaged by a correspondingly shaped sector 48 which projects from a hub 49 fixed to shaft 33. This roller 46 is a part of spindle 50 carried at the end bearings of arms 51 and 52 at either side of the plates 29 and 30 respectively, which arms are pivoted as at 53. Springs 54, one at either side, move the shaft or spindle 50 downwardly as far as permitted by the eccentric stop disc 55. The adjustment is such that the sharp edge of sector 48 tightly engages the notches in the roller 46 and thus very accurately positions plate 41 so that the hammer and notch will engage the proper latch and lever extension even though control from the pattern chain is not so accurately set.

The plate 41 serves when rocked to the dot and dash position of Fig. 3, to engage the extension or extensions 25 of any levers in uppermost position and will move them down so that the pin 26 will be engaged by the notch or notches 37 of their respective latches. In normal operation one lever is released on the down beat or movement of the plate 41 and immediately thereafter a lever previously feeding, is moved to latched position. That provides for introducing the new yarn just prior to withdrawing that which has been feeding previously. The lever 27 and contact piece 28 for all of the striping yarn controlling levers 23 is drawn down by wire 10' and appropriate cams on the drum 7 whenever it is desired to discontinue feeding all the striping yarns. Such action may occur when starting the heel or toe. The levers controlled by wires 10, Fig. 4 may function entirely independently of the remaining levers which are preferably to be employed only during such times as patterning by horizontal striping is in progress.

Now referring to Figs. 1, 2, 4, 6, 7 and 8, the rod or shaft 35 extends for considerable distance beyond the plate 30 and is supported by another bearing 56 adjacent the upper end of post 57. The rod has two collars 58 and 59 fixed thereto from which project ears or lugs 60 and 61. A pin 62 extends through each of the lugs and is engaged by or between the extensions 63 and 64 from one end of the horizontally disposed part 65 of a bell crank lever pivoted at 66 on post 57. This bell crank lever has a second arm 67 which connects to a link 68 in turn connected adjustably at 69 to one arm 70 of another lever pivoted at 71 on a depending bracket 72. This lever has a second arm 73, the inner end of which is adapted to be engaged by a roller or rollers 74 suitably spaced and positioned at the inner side of the 104 tooth gear 75. Each time one of those rollers 74 engages the lever 73 to rock the same, it will correspondingly move the lever 65 and through the projecting extensions 63 and 64, pin 62, etc., will impart a rocking or oscillating movement to shaft 33 and other mechanism thereon. A spring 68' tends to move the elements in the opposite direction to that imparted by the lever 73. One rocking movement of that shaft is effective to release one yarn lever and withdraw that which was previously feeding. Thus each roller 74 on the 104 toothed gear shaft will bring about one change of yarn at the machine needles. Depending upon frequency with which changes are to be made, one or more of these rollers 74 will be suitably positioned on the gear 75. For example, if four such rollers are provided, there will be a possibility of a yarn change once in each revolution of the machine. Probably that is as frequently as it would be desired in actual practice to change yarns, and in some instances, it might not be desired to change all yarns or have the possibility of changing all yarns once each course. If so, fewer rollers may be employed.

Referring to Figs. 2, 6, 8, 10, 14–19, an extending support 76 carries a bracket 77 in which is adjustably mounted a short shaft 78. At one end of the shaft is a sprocket 79 while the other end of the shaft is guided in a bearing at the upper end of an auxiliary post or bracket 80. The ratchet wheel 81 is also fixed to the shaft, but at the opposite side of bracket 77 from that at which sprocket 79 is disposed. A chain generally indicated by numeral 82 is driven by sprocket 79 and passes around a second smaller sprocket 83 pivoted at 84 at one end of an adjustable guide 85. The chain may be of any convenient length depending upon the pattern to be knitted and is composed of links having at one side lugs 86 of different heights, there being as many heights of these lugs as there are striping yarns. These are the lugs from which control of the striping yarn changing means is taken, that is, these lugs determine the axial position of shaft 33 prior to that shaft being oscillated to effect a yarn change.

At the opposite side of each of the links there may be provided a projection 87, these projections all being identical and for the purpose of controlling the binder and cutter in a manner hereinafter to be described.

Figure 10:
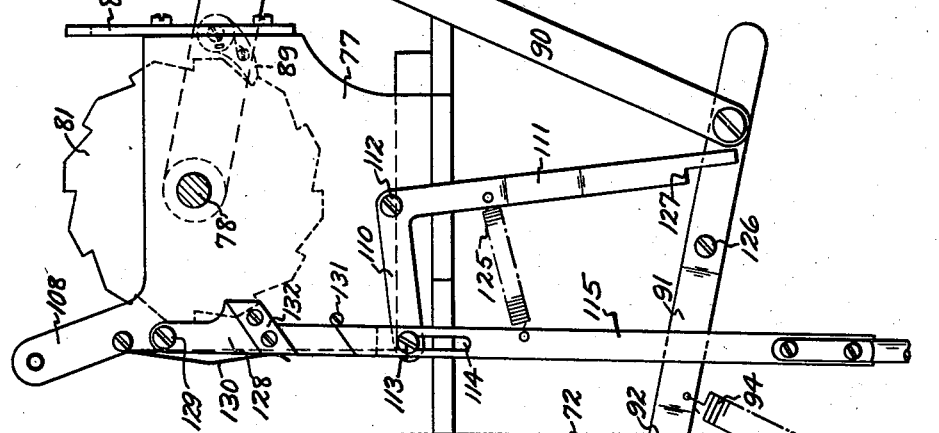
Fig. 10 is a detail showing the ratcheting means for the chain and also the retiming means while it is not effective.
Figure 12:
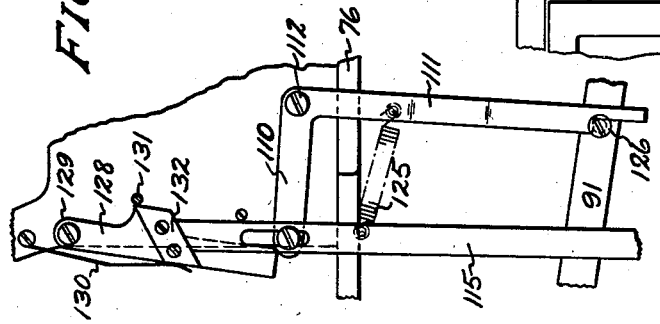
Fig. 12 shows the retiming mechanism as it is effective.

The ratchet wheel 81 is to be periodically moved or ratcheted by mechanism shown at Fig. 10 and other figures and comprising a lever 88 pivoted at 78 and carrying a spring pressed pawl 89. The link 90 connects to the outer end of lever 88 and also to a second lever 91 pivoted at 92 on the depending bracket 72. This lever 91 is adapted to engage the rollers 74 previously described with respect to the actuation of lever 73, etc., Fig. 8, and when moved by one of those rollers will impart to the wheel 81 a ratcheting movement of one tooth. A stop 88' limits movement of lever 88 upwardly. Obviously the rollers 74 must be so spaced on the gear 75 that there will be a ratcheting movement for positioning shaft 33 as often as it is desired to make a yarn change. That may be at each course or at other intervals. It is to be noted that lever 91 will be contacted by one of the rollers 74 slightly before the previously mentioned lever 73 is actuated. This allows the chain to be moved first thereby positioning the shaft 33 just before it is given an oscillating movement incidental to changing the position of the yarn feeding levers themselves. Springs 93 and 94 connect at either side of the pivot 92 and are of such a tension as to maintain that lever positioned properly to be engaged by rollers 74 but cushion the return movement and prevent undue vibration and noise.

Figures 18, 19:
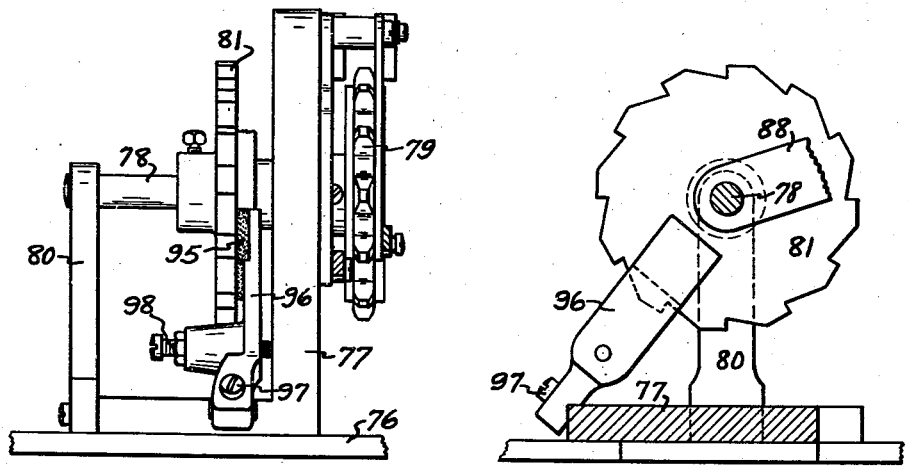
Fig. 18 is an elevation showing the sprocket by means of which the chain is driven, the ratchet wheel for the same and a friction means for maintaining said ratchet wheel and incidentally the chain in whatever position those parts are moved.
Fig. 19 shows that mechanism of Fig. 18 as seen from a different viewpoint.

In Figs. 18 and 19 means is shown for preventing any undesired movement of the ratchet wheel and incidentally the chain. A leather or fiber brake surface 95 bears against one side of ratchet wheel 81 as it is placed against said wheel by the arm 96 pivoted at 97 and adjustably positioned by a screw 98. This brake exerts just enough resistance to prevent overrunning of the chain or to prohibit it from moving in an undesired manner during machine operation.

Referring particularly to Figs. 2, 6 and 8, the shaft 33 has collars 99 and 100 adjacent the end nearest the pattern chain, said collars being engaged by the forked end 101 of lever 102 adjustably pivoted at 103. This lever is pulled in one direction by a spring 104, but is also movable against the tension of the spring by connections including link 105 and a bell crank 106 pivoted at 107 to a projection 108 from the bracket 77. This bell crank lever has a toe 109 which is adapted to engage upon the lugs 86 at the so-called inner side of the chain. Depending upon the height of these lugs, the bell crank lever 106 will be effective to move shaft 33 axially thereby selectively to position the hammer 44 and the slot 43 for actuating latches 35 and for effecting predetermined yarn changes. Obviously, if several courses are to be knitted from any one of the striping yarns, lugs at that part of the chain will be of the same height and even though there is a possibility of pattern change or striping yarn change, the mechanism thus far described will be actuated without effect so far as actually making a change of any striping yarn is concerned.

At certain times it is desired to stop ratcheting of the chain and to retime it preparatory to starting again in the pattern. To do this mechanism shown in Figs. 8, 10, 11, 12 and 21–24 is to be employed. A lever having a horizontal arm 110 and a more or less vertical arm 111 is pivoted at 112 and engages by a shoulder screw 113 within a slot 114, a bare 115 which extends downwardly to connect at the outer end of an extension 116 on lever 117 which is pivoted at 118 on bracket 119 adjacent the lower part of the frame. This lever has a cam engaging toe 120 engageable with cam 121 and 122 on drum 123 at the outer end of the main cam shaft. A spring 124 normally maintains the toe of the lever against the drum except when raised by the cams.

The said lever having arms 110 and 111 is also spring urged by springs 125, Fig. 10, in a direction which would normally tend to bring the lower end of the lever into engagement with a projecting pin 126 in the pawl actuating lever 91. A notch or shoulder 127 at the lower end of the arm 111 will engage the pin upon downward movement of the pawl and when thus engaged, Fig. 12, rollers 74 will be ineffective to impart further ratcheting movements to the chain.

A detent 128 is pivoted at 129 and is pressed by a leaf spring 130 to the position shown in Fig. 10. In that position the lower end of the detent bears above the horizontal arm 110 and prevents the notch 127 from swinging to a position where it might engage the pin 126. At certain times a projecting stud or pin 131, Fig. 9, travels around with the chain and contacts against the detent 128 moving it away from lever 110 so that the spring 125 can draw the notched lever 111 into the position of Fig. 12 whereupon lever 91 will be held in an inactive position. The bar 115 has a bevelled end which engages the inclined piece 132 on the detent and cams it and the detent to the left, Fig. 12, so that the detent will be held in that position until such time as toe 120 of the lever 117 drops from one of the cams on drum 123. Then the bar will move downwardly swinging the notched lever away from pin 126 thus starting the ratcheting movement again. This mechanism just described is effective to prevent ratcheting of the chain when the pattern is stopped, also retimes the mechanism for starting a subsequent patterned area.

Figure 20:
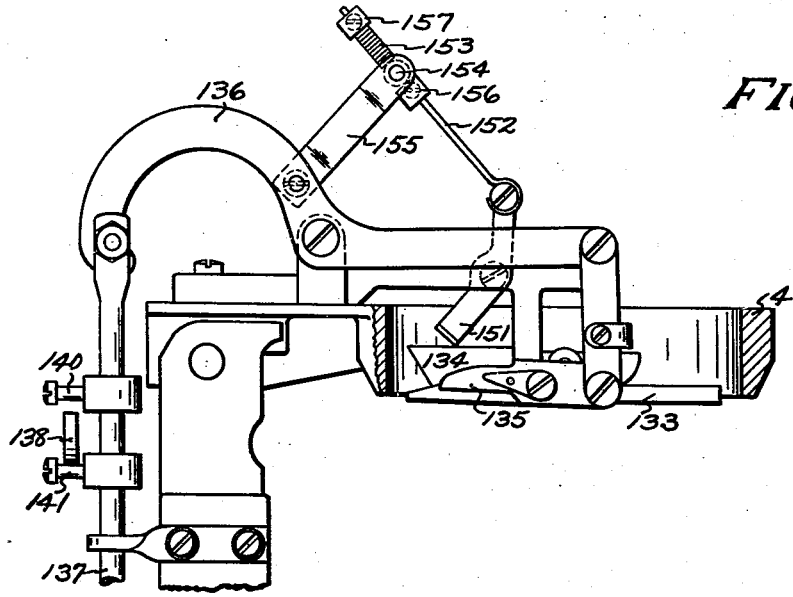
Fig. 20 is a section through the carrier ring of the machine showing the binder and cutter and an auxiliary control for the supplementary binder.

Now referring to Figs. 13 and 20, a binder such as that usually employed on Banner machines is mounted on the carrier ring 4 and has a binder plate 133, a main binder, an auxiliary binder 134 and a cutter 135. The binder and cutter are controlled from the usual lever 136 connected by a link 137 to be operated from certain appropriate cams on one of the pattern drums. The said binder and cutter are operated by such cams throughout the usual changes in knitting a stocking; that is common practice and need not be described here.

Special mechanism for controlling the binder and cutter when changes of striping yarns are made includes a lever 138 pivoted at 139 on a bracket 139' and engaging between certain projections 140 and 141 extending from adjustable collars arranged on the link 137. Movements of lever 138 will obviously result in opening the binder and cutter preparatory to receiving a yarn, said binder and cutter being closed by spring means well known to those familiar with such devices.

Referring to Figs. 6, 8, 13 and 14, a depending link 142 is pivoted at 143 on the lever 65 and is connected at its lower end by a spring 144 so that the said link is normally held in the position of Fig. 8. Said link has a notch 145 which, when engaged at the free end of lever 138 will move that lever in such a direction as to open the binder and cutter. Since the lever 65 is periodically moved to oscillate shaft 33 whenever a yarn change is to be brought about, this opening of the binder will also occur at the proper time. Position of the notch 145 is such that the binder will open in advance of the withdrawing of a yarn and will remain open until such time as that yarn has been taken into the binder.

Even though wide stripes are made in which gear 75 makes more than one revolution during the stripe in which event shaft 33 may be oscillated several times without yarn change, the binder is only opened when an actual yarn change is to be made. To control that function the lugs 87 on the chain are so disposed as to engage a toe 146 on a bell crank lever 147 at such times as a yarn is to be withdrawn and taken into the binder. This lever 147 connects by means of a link 148 to the link 142. A slot 149 and spring 150 provides effective movement of the parts and also allows for overtravel. Whenever the toe 146 rides upon a cam lug 87, the link 142 will be moved to the position it occupies in Fig. 14 and will be affected by the shaft oscillating means thereby bringing about the desired opening of the binder and cutter.

The number of striping yarns is greater than has heretofore been employed and as a result, the binder is forced to take care of an unusual number of yarns at one time. To do this the auxiliary binder 134 is spring pressed by means of lever 151, wire 152 and a spring 153 as shown in Fig. 20. The wire is freely movable through an opening in a stud 154 at the outer end of a brace 155. Collars 156 and 157 are so positioned that the spring is under sufficient compression to maintain lever 151 resiliently in contact with auxiliary binder 134, and when the binder and cutter are opened, movement of lever 136 will release that pressure as the stud pushes against collar 156 swinging the lever 151 away from said auxiliary binder. This assures that the auxiliary binder will be effective only through its weight when yarns are to be received into the binder, but at other times will very materially assist in holding the numerous yarns which must be in the binder at most times.

The manner in which ratcheting of the chain has been prevented at parts of the knitting in which no patterning is done has been described, and it is also desirable to prevent movement of the binder and cutter except when striping yarns are being changed. To do this finger 158, Figs. 2 and 8, will be moved to contact a pin 159 projecting from the link 148. This finger is fixed to a short spindle 160 freely pivoted in bearings in the post 157 and in another post 161 attached to the circular base of the machine. This spindle also has fixed at its outer end a short lever 162 connectible by a depending rod 163 to the outer end of lever 117, Figs. 21 and 22. Movement of lever 117 thus simultaneously stops working of the binder and cutter as controlled by the pattern chain and sets the retiming mechanism for stopping the chain when the same has reached a retimed position.

In Figs. 15, 16 and 17 a modified form of pattern chain has been shown. This chain is indicated at 82' and is composed of links 164 having the lugs 165 which may be of a proper height to support the follower 109 in whatever position desired to control the proper latch for the particular striping yarn to be fed. In the form of pattern chain shown in Figs. 8 and 9 one link may have a lug at either side and thus it is necessary to have as many links as there are different heights to the lugs 86 or 165, each one with and without a lug 87 at the opposite side. The links 164 have an extension 166 at that opposite side within which is screwed a stud 167. This stud serves the same purpose as lugs 87 on the first form of chain. Thus in this chain it is only necessary to have as many kinds of links as there are heights of lugs 165. The studs 167 may be inserted wherever it is desired to control the binder function.

*Operation*

When it is desired to pattern the stocking or article by striping, the cam or cams on drum 7 will so control the lever 27, Fig. 3, through wire 10' that all of the levers 23 will be released and free to be influenced by the latches 35. The cams on drum 123 will also allow ratcheting of the chain and operation of the binder and cutter as previously described. Then as the roller or rollers 74, Fig. 8, contact levers 91 and 73, the chain will be ratcheted periodically and the shaft or spindle 33 oscillated so that lugs at the inner side of the pattern chain may control the axial position of the shaft 33 while the oscillating means will rack it in such a manner that the hammer 44 and plate 41 function to unlatch desired levers thereby to introduce predetermined colored striping yarns at proper intervals, and also to withdraw from feeding position that yarn or yarns which had been feeding and knitting a stripe of different color. The binder will be opened to receive the yarn which is withdrawn at each of these striping yarn changes by means of the lugs at the outside of the chain, lever 142 will be moved as shown in Fig. 14 so that said binder will be opened by this mechanism rather than by the usual control from the main pattern drum. This actuation of the binder occurs only at such time as a change is actually made.

When striping is to be discontinued, the toe of lever 117, Fig. 21, will ride upon one of the cams 121, 122 or other similar cam and the bar 115 will be pushed upwardly so that the inclined end of that bar will bear against the plate 132 on detent 128. Up to that time and until a pin 131, Fig. 9, contacts the detent 128 and swings it to the position of Fig. 12, the notched lever 111 will not engage pin 126 on lever 91. After said detent has been swung to the left as in Fig. 12, that notched lever will engage the pin just mentioned and lever 91 will be held in such a position that it will no longer be effective to rack the pattern chain whereby that mechanism will be held in a predetermined position until striping is again to be started. The invention is defined in the appended claims.

I claim:

1. In a knitting machine the combination of a plurality of yarn feeding means, spring means for retaining said feeding means in one position and other means for moving said means against the tension of said spring means, said other means including a plurality of lever engaging elements, one for each lever, and latching means for holding said elements in one position and means for latching and unlatching said levers including a swinging plate and hammer, said plate being adapted to press all of said lever controlling means to a latching position except one, said hammer being adapted to unlatch that one of said latching means which is not so pressed.

2. In a knitting machine the combination of yarn feeding levers pivotable and adapted to be moved to and from a feeding position, spring means for moving said levers in one direction and positively controlled means for moving said levers in the other direction, latching means for retaining said controlling means and levers in a non-feeding position and periodically moving means for unlatching said latching means at predetermined times including a swinging element in the form of a plate for pressing certain of said controlling levers to a latching position and means on said swinging element for engaging one latch and releasing it.

3. In a knitting machine the combination of a plurality of yarn feeding levers movable to and from feeding position, means for controlling said levers including a series of control levers, one for each of the feeding levers, a latch for each of these control levers, a swinging element including a plate for pressing certain of said controlling levers downwardly and a hammer for engaging a latch and for pressing it out of latching engagement with its cooperating control lever.

4. In a knitting machine the combination of a plurality of yarn feeding levers movable to and from feeding position, means for controlling said levers capable of being latched in one position by a plurality of latches, one for each of said means, a swinging plate and hammer, said plate being adapted to press all of said lever controlling means to a latching position except one which is to be unlatched as said hammer engages a predetermined one of the latches in accordance with a pattern control.

5. Means for controlling a series of yarn feeding levers including a plurality of lever controlling means, a latch for each of said means, a movable mechanism including a latch pressing hammer and a plate, said hammer being adapted to engage a latch and to release it from its cooperating lever controlling means, said plate being attached to move all others of said means to a latched position and pattern control means for selectively positioning said hammer and plate thereby to select and move to feeding position any desired one of said yarn feeding levers.

6. In a knitting machine the combination of yarn feeding means, selecting means for the yarn feeding means including a shaft capable of being oscillated and also moved axially, means for oscillating said shaft periodically during operation of the machine and other means for imparting to the shaft different axial positions including a pattern chain, differentiated lugs on said chain, and means connected to said shaft and affected by said chain lugs for axially moving the shaft prior to each oscillating movement imparted thereto and means for unlatching and latching controlling means for the said feeding means including a swinging plate and hammer, the plate being adapted to latch all but one of said means and the hammer being so constructed and position as to unlatch that means not controlled by said plate to be latched.

7. In a knitting machine the combination as defined in claim 6 wherein said pattern chain is to be ratcheted periodically and at timed intervals corresponding to oscillating movements imparted to the shaft.

8. Mechanism as defined in claim 6 wherein said pattern chain is periodicaly ratcheted and is also so controlled to be retimed at predetermined parts of the cycle of knitting.

9. In a knitting machine the combination of a plurality of yarn feeding levers pivoting about a horizontal axis and movable to and from a yarn feeding position, said levers being of a thickness insufficient for an opening to be drilled vertically through the lever and through which a yarn may be threaded, the yarn feeding end of said levers being constructed of about half the thickness of the remainder of the lever and provided with an opening transversely thereof through which the yarn is to be threaded, said thin ends of the levers being so disposed that while they are relatively close to each other, there will be sufficient space for the feeding yarn to be fed without interference or contact with an adjoining lever or feeding yarn.

10. In a knitting machine the combination of a plurality of yarn feeding levers movable about a common axis to and from a yarn feeding position, said levers being positioned closely adjacent each other and being relatively thin so as to feed a relatively great number of yarns in a space of as little width as practicable, the actual thickness of each lever being insufficient for provision of an opening transverse to the thickness of said lever through which a yarn might be threaded and satisfactorily fed, each lever having its yarn feeding end cut away so as to render the said end of about half the thickness of the rest of the lever, each lever being cut away at the same side and having an opening through this thin end through which yarn is to be threaded.

11. In a knitting machine the combination of a mouthpiece and a plurality of yarn feeding levers of much less thickness than is normally required for an opening to be drilled transversely to the thickness of the lever to feed a yarn as is common practice, each lever being movable to and from a yarn feeding position, the end of each lever being cut away so as to render that portion of much less thickness than the remainder of the lever, each lever in the group within the mouthpiece being cut away at the same side and having an opening through the thin end whereby a yarn may be threaded through each of these ends and levers may be moved to and from feeding position without interference between the yarns or between the yarns and levers.

12. A yarn feeding lever for knitting machines of the type described, of integral construction and of a thickness insufficient for an opening to be drilled through which a yarn might be threaded transversely of the thickness of the lever and be fed in a normal way, the end of said lever being cut away at one side so that material left is of about half the thickness of the remainder of the lever, said thin end having an opening for the yarn extending in the direction of the thickness of said lever.

13. Means for controlling a series of yarn feeding levers including a plurality of plungers one of which is engaged with each of said levers, swinging levers for actuating said plungers, latches, one for each swinging lever for maintaining that lever in a position to withdraw a yarn feeding lever from its feeding position, means for selectively unlatching desired ones and latching others of said swinging levers including a rocking element adapted to press all of said swinging levers to a latching position and for latching all of them except a single selected one of said swinging levers and means for unlatching that selected one so that a yarn feeding lever controlled thereby may feed its yarn while all other yarns are withdrawn, said means being controllable from a pattern periodically moved to present different selective movements to the rocking element and the means for unlatching a selected one of the levers.

14. In a knitting machine the combination of a plurality of yarn feeding levers, means adapted to move predetermined ones of said yarn feeding levers to feeding position and others to non-feeding position including an oscillating shaft, a series of latches for retaining yarn feeding levers in one position, control means on said shaft constructed and operable for engaging any one of the series of latches to release a predetermined yarn feeding lever and immediately thereafter to lock in an inactive position any other lever which has previously been feeding, means for periodically rocking said shaft and means functioning in advance of each rocking movement for moving said shaft axially thereby to determine which of said latches and levers shall be affected.

15. Mechanism as defined in claim 14 wherein said means for axially moving the shaft includes a pattern chain, differentiated lugs thereon and linkage adapted to follow the differentiated lugs on said chain and impart corresponding movements to the shaft.

ARTHUR N. CLOUTIER.